(12) United States Patent
Bellion

(10) Patent No.: US 6,343,544 B1
(45) Date of Patent: Feb. 5, 2002

(54) COOKING APPARATUS

(76) Inventor: Alexandre Bellion, Route de Sainte-Cecile, 85110 Saint Vincent Sterlanges (FR)

( * ) Notice: Subject to any disclaimer, the term of this patent is extended or adjusted under 35 U.S.C. 154(b) by 0 days.

(21) Appl. No.: 09/809,100

(22) Filed: Mar. 16, 2001

(51) Int. Cl.[7] .......................... A47J 37/00; A47J 37/04; A47J 37/07
(52) U.S. Cl. ................. 99/421 H; 99/419; 99/421 HH; 99/421 P
(58) Field of Search ............... 99/339, 340, 419–421 V, 99/444–450, 481, 482; 126/25 R, 9 R

(56) References Cited

U.S. PATENT DOCUMENTS 3,706,272 A * 12/1972 Wilson ........................ 99/340
5,136,933 A * 8/1992 Derakhshan .............. 99/421 P
5,184,540 A * 2/1993 Riccio ....................... 99/421 H
5,471,915 A * 12/1995 Lopata ....................... 99/421 H
5,473,977 A * 12/1995 Koether et al. ............. 99/421 P
5,562,022 A * 10/1996 Schmid et al. ............. 99/419 X
5,799,569 A * 9/1998 Moreth ....................... 99/421 H

* cited by examiner

Primary Examiner—Timothy F. Simone
(74) Attorney, Agent, or Firm—Young & Thompson

(57) ABSTRACT

A cooking apparatus includes, positioned in the vicinity of a heat source and installed on a frame, a skewer support, carrying a plurality of bearings distributed about a circle, and in which may be housed, in a removable and freely rotatable manner, skewers such that the skewer shafts are parallel to one another and disposed equidistantly from the center of the circle. Each skewer shaft has a satellite element cooperating, when the skewers are engaged in the bearings, with at least one planetary element, such that the skewer shafts are driven simultaneously and continuously in rotation about their axes during a relative displacement between satellite elements and planetary element.

15 Claims, 4 Drawing Sheets

COOKING APPARATUS

FIELD OF THE INVENTION

The present invention concerns a cooking apparatus, such as an oven, roasting jack, rotisserie, grill or the like, of the type comprising, positioned in the vicinity of a heat source and installed on a frame, a skewer support, carrying a plurality of bearings distributed in a circle, and in which may be housed skewers such that the skewer axes are parallel to one another and are disposed equidistantly from the center of the circle.

BACKGROUND OF THE INVENTION

Such cooking apparatuses are well known to those skilled in this art. In this type of apparatus, the bearings are generally driven in rotation about the circle to bring the skewers fixed inside said bearings in front of heat sources of whatever type disposed about the circle. In the course of this cooking, the grease from the products to be cooked is liquified and tends to accumulate beneath the skewers. This grease may if desired be recovered in a drip pan. Nevertheless, as the grease is at all time being liberated from the product regardless of the position of the skewer on the circle of bearings, significant spattering of grease occurs onto the side walls of the cooking enclosure, requiring a thorough cleaning. Moreover, in certain cooking apparatuses, the skewers are mounted directly above a pit constituting the cooking enclosure. That pit, loaded with material to be burned, such as wood or charcoal, is closed at its upper part by a cooking grill on which falls the grease from the products. Owing to the proximity of the fire, the risk of the grease catching fire is very significant.

SUMMARY OF THE INVENTION

An object of the present invention is to propose a cooking apparatus whose design permits limiting the drops of grease from the products to be cooked, such that cleaning of the apparatus is facilitated and the risks of grease fires are reduced.

To that end, the invention has as an object a cooking apparatus, such as an oven, roasting jack, rotisserie, grill or the like, of the type comprising, positioned in the vicinity of a heat source and installed on a frame, a skewer support, carrying a plurality of bearings distributed about a circle, and in which may be mounted, in a removable and freely rotatable manner, skewers such that the skewer axes are parallel to one another and disposed equidistantly from the center of the circle, characterized in that each skewer shaft is provided with a satellite element that cooperates, when the skewers are engaged in the bearings, with at least one planetary element, such that the skewer shafts are simultaneously and continuously driven in rotation about their own axes during relative displacement between the satellite and planetary elements.

By virtue of the fact that the skewer shafts are continuously driven in rotation about themselves, the grease from the product to be cooked tends to be displaced permanently along the body of the product by sliding along this latter, without ever falling downwardly. Furthermore, the film of grease thus formed on the surface of the product to be cooked tends to improve its organoleptic properties after cooking by preventing a drying out of the surface of the product to be cooked during cooking.

BRIEF DESCRIPTION OF THE DRAWINGS

The invention will be better understood from a reading of the following description of embodiments, with reference to the accompanying drawings, in which.

DETAILED DESCRIPTION OF THE INVENTION

Figure 1:
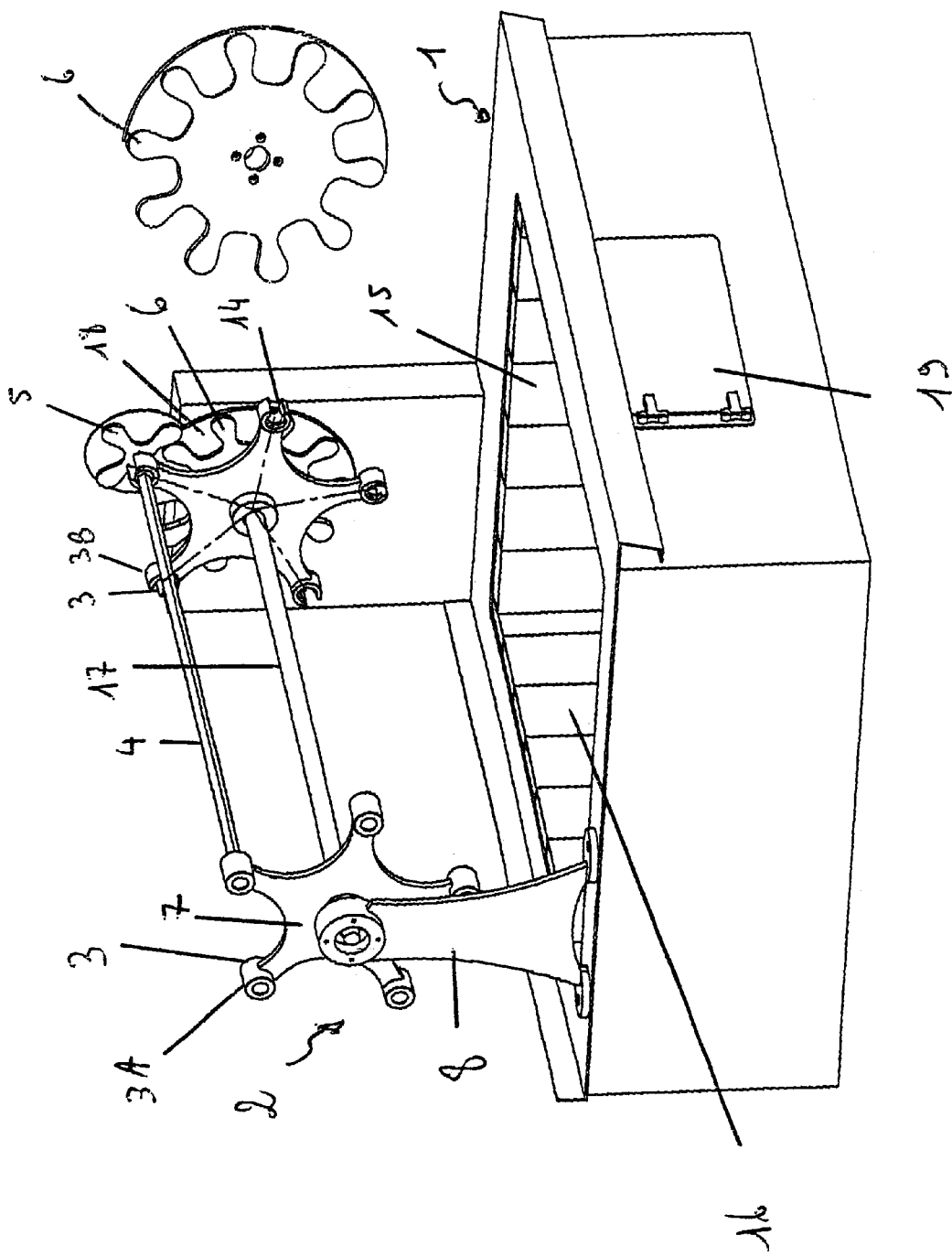
FIG. 1 shows a perspective view of a cooking apparatus according to the invention with a view in enlarged detail of a planetary gear.

As mentioned above, the cooking apparatus according to the invention may be applied equally to an oven, a roasting jack, a rotisserie, a grill or the like. This cooking apparatus comprises, positioned in the vicinity of a heat source 16 of any type and installed on a frame 1, a skewer support 2 carrying a plurality of bearings 3 distributed about a circle, as illustrated in FIG. 1. In these bearings 3 may be mounted, in a removable and freely rotatable manner, skewers 4. The shafts of skewers 4 thus extend parallel to one another and are disposed equidistantly from the center of the circle formed by the bearings 3. These skewers 4 are formed in a conventional manner from a generally metallic shaft, preferably having a square cross section, one end of which is tapered to form an end for introduction into the food products to be skewered, such as chicken, guinea hens or other fowl, whereas the other end of the skewer is typically provided with a gripping handle 11.

In a manner characteristic of the invention, each skewer shaft 4 is moreover provided with a satellite gear 5 cooperating, when the skewers 4 are engaged in the bearings 3, with at least one planetary gear 6, such that the shafts of skewers 4 are simultaneously and continuously driven in rotation about their own axes during a relative displacement between satellite gears 5 and planetary gears 6. The speed of rotation of the skewers is about 7 turns/minute. By virtue of this continuous driving of the skewers about their own axes, it was confirmed that the grease from the products to be cooked tends to be displaced at the surface of the product without dripping therefrom. There thus results an absence of spattering of the grease onto the constituent walls of the cooking enclosure, such that the cleaning of such an enclosure is facilitated. Furthermore, the lack of grease spattering limits the risk of fire.

The relative displacement between satellite gear 5 and planetary gear 6 may be obtained according to various embodiments.

Figure 2:
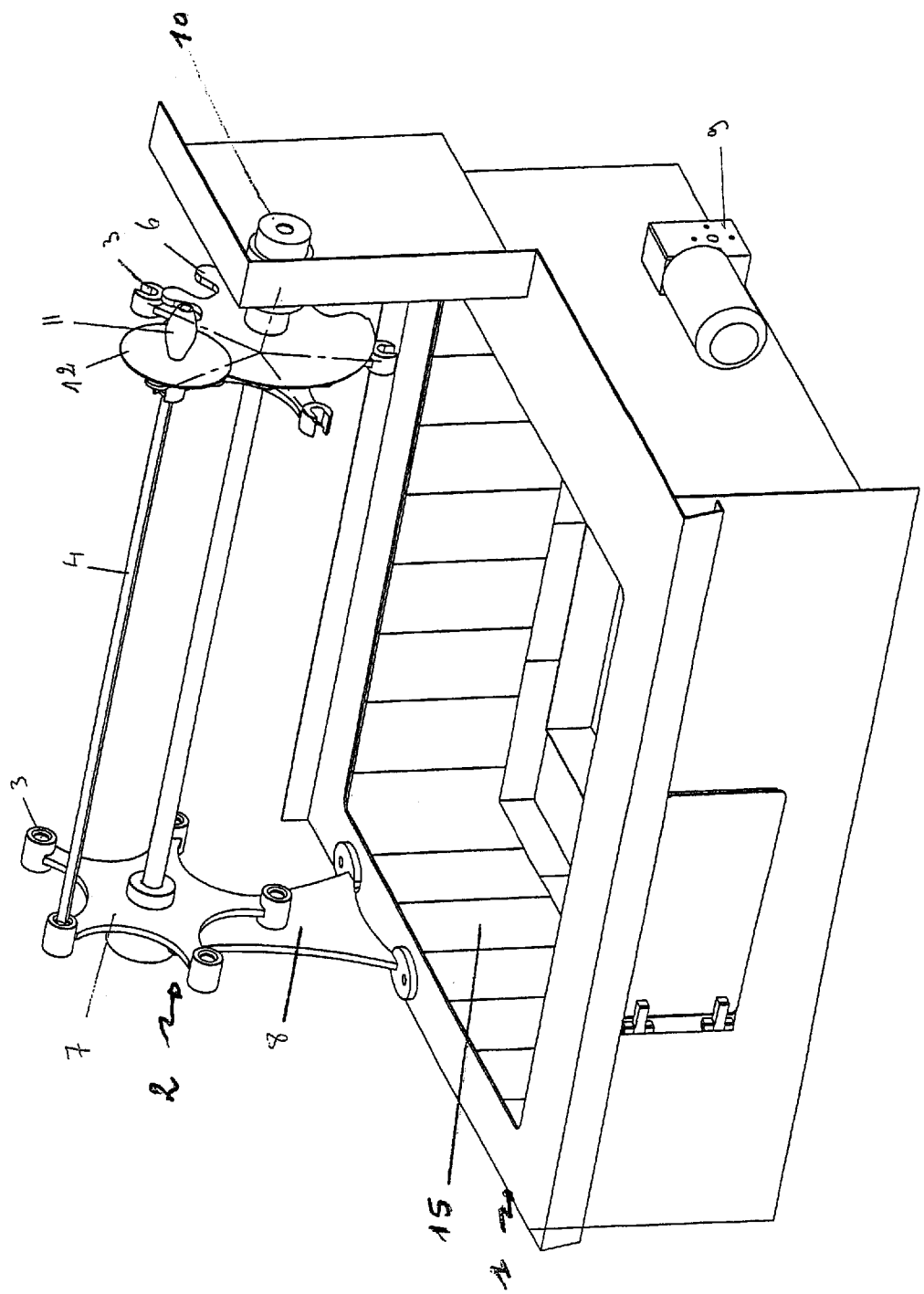
FIG. 2 shows a perspective view of the cooking apparatus of FIG. 1.
Figure 3:
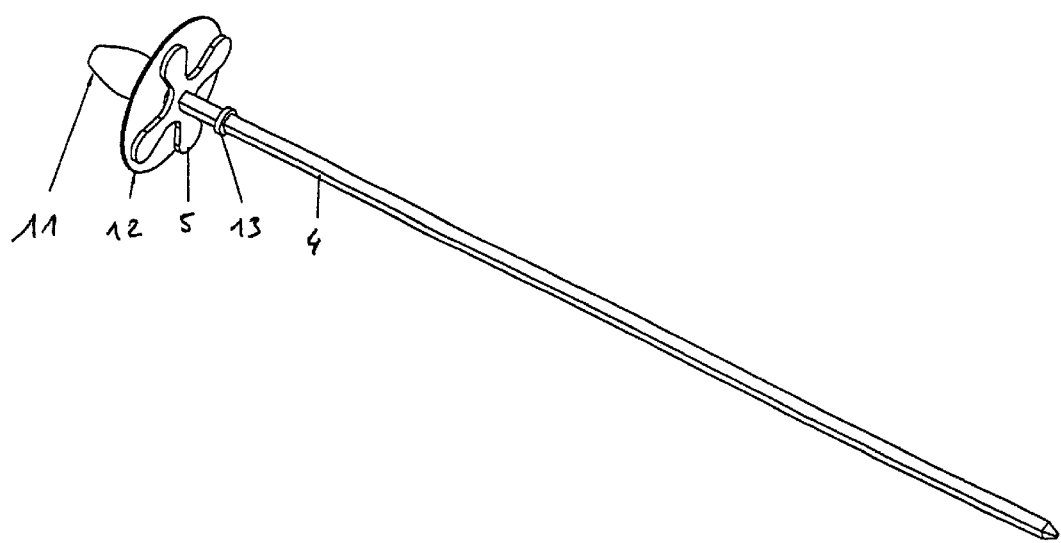
FIG. 3 shows a perspective view of a skewer according to the invention.
Figure 4:
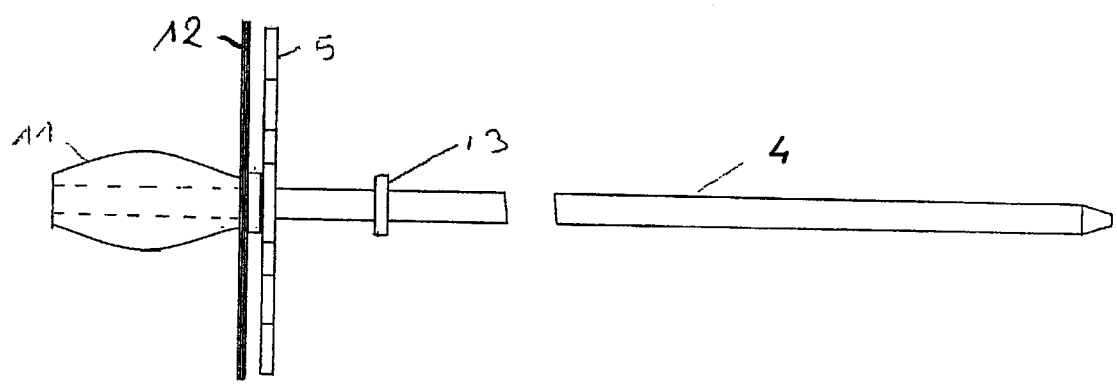
FIG. 4 shows a sectional view of the skewer of FIG. 3.

In a first embodiment according to FIGS. 1 to 3, the bearings 3 supporting skewers 4 are driven in rotation on the circle, and the planetary gear 6 is stationary. The skewer support 2 may also for its part take on a wide variety of shapes. In the example shown, it is present in the form of at least one star-shaped plate 7 whose arms each carry at their ends a skewer-holding bearing 3. This bearing 3 supporting skewers 4 here takes the form either of a split ring, or a sleeve closed at one end according to the skewer shaft portion that it is intended to receive. In the example shown more particularly in FIGS. 1 and 2, the bearings 3 supporting skewers 4 are arranged respectively at the ends of the arms of two star-shaped plates 7 threaded onto a central carrier shaft 17 of the skewer support 2. Plates 7 are fixed in rotation and in translation on said central carrier shaft 17 such that bearings 3 are correspondingly disposed. To maintain these star-shaped plates 7 suspended above the frame 1 and to assure a relative positioning of these latter in relation to the frame 1, these plates are carried by two arms 8. It is to be noted that the central carrier shaft 17 could be omitted provided that each star plate 7 were driven in a manner to render them synchronous in displacement.

Apart from the continuous or discontinuous design of the carrier shaft 17, at least one of the plates 7 of the skewer support 2 is driven by a motor mechanism 9, constituted for example of an asynchronous motor of the 60 hertz, 100 watts and 24 rpm type. This motor 9 is connected by an appropriate transmission device (not shown), such as a tensioned chain transmission device, to the carrier shaft 17 of the star plate 7. A disconnect mechanism 10 is interposed in this linkage, to assure an interruption of the transmission during a desired or premature stoppage of the driving and displacement of the skewers 4. This disconnect mechanism 10 thus permits assuring removal or installation of the skewers with total safety.

In another embodiment not shown, the planetary gear 6 could be driven in rotation about an axis passing through the center of the circle of the skewer bearings 3, the skewer bearings 3 being in that case stationary. The arrangement shown is in any case preferred in that it permits simultaneously with the driving in rotation of the skewers 4 about their own axes, the rotational displacement of the skewers along a circle corresponding to the circle of the bearings, so as to permit passage in front of the heat sources which may be distributed about the bearing circle.

The cooperation between satellite elements 5 and planetary element 6 to permit continuous driving in rotation of the skewers about their axes may take on a wide variety of shapes. In the example shown, satellite gears 5 cooperate in meshing engagement with a planetary gear 6. In this case, the planetary gear 6 and the satellite gears 5 are respectively constituted by toothed wheels, the teeth of the satellite gears 5 engaging into the inter-tooth space of the planetary gear 6 during relative displacement between planetary gear 6 and satellite gears 5. On the other hand, it will be appreciated that the number of teeth of the satellite elements 5 and the number of teeth of the planetary element 6 are respectively even or odd. This arrangement permits each skewer shaft to be shifted by an nth of a rotation, for each complete revolution of a star plate 7. At the end of a certain number of rotations, the shaft 4 returns to its original position. Therefore, when only one heat source is available, it is possible to avoid presenting the same surface of the product to be cooked, to the heat source 16 at each rotation. In the example shown in the figures, the satellite elements 5 are formed as metallic plates whose contour is cut away so as to form a plurality of radial fingers constituting the equivalent of teeth. It will therefore be appreciated that, in the examples shown in FIGS. 1 to 3, each satellite element comprises four teeth or fingers while the planetary element 6, shown in detail in an enlarged manner in FIG. 1 and conceived in a manner similar to the discs, comprises ten teeth. Two complete revolutions of the star plates 7 are necessary to return the skewers to an exact initial position. During these two revolutions, the skewer undergoes six revolutions about its own axis.

In a similar manner, the satellite elements 5 may be respectively constituted of toothed wheels each meshingly engaging with the planetary element 6. In this case, however, the planetary element 6 takes the form of a toothed crown having interior peripheral dentation arranged about an axis passing through the center of the circle of the bearings 3. In that case, the teeth of the planetary element 6 are disposed outwardly of the circle formed by the teeth of the satellite elements 5 and no longer inside of the circle as is shown in FIGS. 1 to 3.

It could also be envisioned, in another embodiment not shown, that the satellite elements cooperate by friction with a planetary element.

As mentioned above, the skewer 4 is supported by two bearings 3 arranged along a line parallel to an axis passing through the center of the circle of the bearings 3. To permit the engagement of the skewer inside said bearings, the bearing 3A for supporting skewers, intended to receive the end of the skewer adapted to penetrate into the product to be cooked, is compression spring loaded so as to urge the skewer shaft in the direction of the other bearing 3B provided with an internal shoulder adapted to form the seat for a ring 13 carried by the skewer shaft so as to immobilize axially the skewer shaft inside said bearings 3A, 3B while permitting its removal. It will be noted that, in this case, the bearing 3B is constituted of a split ring which permits introduction of the skewer inside said bearing whereas bearing 3A takes the shape of a sleeve closed at one end and housing on its base a compression spring.

To effect this introduction or this removal of the skewer with total safety, each skewer 4, which is provided with a gripping handle 11 in the vicinity of which is positioned a satellite element 5, comprises a plate 12 forming a guard interposed between a satellite element 5 and handle 11 so as to prevent any risk of injuring the operator. In the same manner, the teeth of planetary element 6 are rendered inaccessible to the operator during installation or removal of the skewers 4, through the intermediary of a cover plate 18 for the planetary element 6 interposed between planetary element 5 and arms 8 of the skewer support 2.

As mentioned above, such a skewer support 2 may be adapted to any type of cooking apparatus known or unknown at present. In the example shown, the support 2 for skewers 4 is disposed above a pit 15 constituting the cooking enclosure. This pit 15 is delimited by side walls and a bottom wall which constitutes the frame 1 of the apparatus. These walls, typically of metal, may be internally lined with refractory material so as to constitute a fire box inside of which can be disposed combustible material, such as charcoal or wood constituting a heat source 16. This charcoal or this wood may be introduced inside said fire box through a flap 19 positioned along one of the outer side walls of said pit. This pit is then covered with a grill on which may be cooked foods alongside the cooking of the products on the skewers. The skewer support 2 may rest on top of the side walls of the frame 1 and be fixed to these latter. Owing to the continuous driving in rotation of the skewers about their axes, the grease from the products to be cooked does not tend to spill down onto the surface of the grill, such that any undesired flaming is avoided.

Although in the example shown the heat source chosen is constituted of a wood grill, it is to be noted that this heat source may be selected just the same from the group constituted of gas grills, charcoal grills, gas burners, stoves, ovens, fireplaces, electric heating elements, charcoal, etc.

What is claimed is:

1. A cooking apparatus comprising:

a skewer support positioned in the vicinity of a heat source and installed on a frame; said skewer support carrying a plurality of bearings distributed about a circle;

a plurality of skewers having skewer shafts, and adapted to be mounted in said bearings in a removable and freely rotatable manner, such that the skewer shafts are parallel to one another and are disposed equidistantly from the center of the circle; and each skewer shaft being provided with a satellite element cooperating, when the skewers are engaged in the bearings, with at least one planetary element, such that the skewer shafts are simultaneously and continuously driven in rotation about their axes during relative displacement between the satellite elements and the planetary element.

2. The cooking apparatus according to claim 1, wherein the bearings supporting skewers are driven in rotation about the circle, and the planetary element is stationary.

3. The cooking apparatus according to claim 1, wherein the skewer support comprises at least one star-shaped plate having arms which carry at their ends a bearing supporting a skewer.

4. The cooking apparatus according to claim 3, wherein at least one of the plates of the skewer support is driven by a motor mechanism with interposition of a disconnect device assuring an interruption of transmission during a desired or premature stoppage of the driving in displacement of the skewers.

5. The cooking apparatus according to claim 3, wherein the bearings are arranged respectively at the ends of the arms of two star-shaped plates threaded onto a central carrier shaft of the skewer support; said plates being fixed in rotation and in translation onto said central carrier shaft such that the bearings are correspondingly disposed.

6. The cooking apparatus according to claim 1, wherein the skewer bearings are stationary, and the planetary element is driven in rotation about an axis passing through the center of the skewer bearings.

7. The cooking apparatus according to claim 1, wherein the satellite elements cooperate by meshing engagement with a planetary element.

8. The cooking apparatus according to claim 1, wherein the planetary element and the satellite elements are respectively constituted of toothed wheels, the teeth of the satellite elements engaging into an inter-tooth space of the planetary element during relative displacement between planetary element and satellite elements.

9. The cooking apparatus according to claim 8, wherein the number of teeth of the satellite elements and the number of teeth of the planetary element are respectively even or odd.

10. The cooking apparatus according to claim 1, wherein the planetary element comprises a toothed crown having internal peripheral dentation arranged about an axis passing through the center of the circle of bearings, and the satellite elements are respectively constituted of toothed wheels each meshingly engaging with the planetary element.

11. The cooking apparatus according to claim 1, wherein the satellite elements cooperate by friction with a planetary element.

12. The cooking apparatus according to claim 1, wherein each skewer comprises a grasping handle and a satellite element is positioned in the vicinity of said handle; and a plate forming a guard being interposed between the satellite element and the handle so as to prevent any risk of injury to an operator during installation or removal of the skewer from its bearings.

13. The cooking apparatus according to claim 1, wherein the skewer is supported by two bearings arranged along a line parallel to one having an axis passing through the center of the circle of bearings; one of the two bearings intended to receive a skewer end adapted to penetrate into a product to be cooked, being compression spring loaded so as to urge the skewer shaft in a direction toward the other bearing provided with an internal shoulder adapted to constitute a seat of a ring carried by the skewer shaft so as to axially immobilize the skewer shaft inside said two bearings while permitting its removal.

14. The cooking apparatus according to claim 1, wherein the skewer support is disposed above a pit constituting a cooking enclosure.

15. The cooking apparatus according to claim 1, wherein the heat source is selected from the group consisting of a gas grill, a charcoal grill, a gas burner, a stove, an oven, a fireplace, and electric heating elements.

* * * * *